United States Patent
Hood

[19]

[11] Patent Number: 6,030,305
[45] Date of Patent: Feb. 29, 2000

[54] SEMI-AUTOMATIC TENSIONER FOR A BELT DRIVE SYSTEM

[75] Inventor: James A. Hood, Concord, N.C.

[73] Assignee: Ingersoll-Rand Company, Woodcliff Lake, N.J.

[21] Appl. No.: 09/161,863

[22] Filed: Sep. 28, 1998

[51] Int. Cl.$^7$ .............................. F16H 7/08; F16H 7/14; F16H 7/24

[52] U.S. Cl. .......................... 474/109; 474/115; 474/150

[58] Field of Search ..................................... 474/101, 109, 474/113, 114, 115, 117, 126, 133, 135, 136, 138, 144, 148, 150

[56] References Cited

U.S. PATENT DOCUMENTS

| | | | |
|---|---|---|---|
| 1,077,339 | 11/1913 | Farrell . | |
| 1,442,569 | 1/1923 | Holt . | |
| 1,835,617 | 12/1931 | Stewart | 474/135 |
| 3,413,866 | 12/1968 | Ford | 474/138 |
| 3,422,692 | 1/1969 | Woodring | 74/242.1 |
| 3,477,670 | 11/1969 | Sloyan | 474/115 |
| 3,593,590 | 7/1971 | Kesl et al. | 74/242.11 A |
| 3,837,291 | 9/1974 | Umlor | 474/138 |
| 3,978,737 | 9/1976 | Bailey | 474/138 |
| 4,344,598 | 8/1982 | Sloyan | 474/115 |
| 4,403,454 | 9/1983 | Glore et al. | 474/126 |
| 4,525,153 | 6/1985 | Wilson | 474/138 |
| 4,535,568 | 8/1985 | LaFave | 51/148 |
| 4,571,221 | 2/1986 | Isobe et al. | 474/101 |
| 4,887,948 | 12/1989 | Calmettes | 411/5 |
| 4,934,884 | 6/1990 | Rooke | 411/8 |
| 5,002,518 | 3/1991 | Pennatto | 474/113 |
| 5,030,173 | 7/1991 | Bryant | 474/136 |
| 5,041,062 | 8/1991 | Dornhoff | 474/144 |

Primary Examiner—Tamara L. Graysay
Assistant Examiner—Matthew A. Kaness
Attorney, Agent, or Firm—Michael M. Gnibus

[57] ABSTRACT

A belt tensioning device includes a first element having a threaded opening and a first pulley supported on the first element. The device further includes a second element having an opening in substantial alignment with the threaded opening of the first element and a second pulley supported on the second element. A belt is secured around and between the first and second pulleys. The belt tensioning device also includes an element for applying a tension force to the belt. In one preferred embodiment the element for applying a tension force to the belt includes a rotatable screw extending between the first and second support elements. The screw has a first end including a threaded portion adapted for threadably engaging the threaded opening of the first element and a second end remote therefrom adapted for extending into the opening of the second support element. The element for applying a tension force also includes a shoulder fixed to the screw, between the first and second ends thereof. A spring is provided around the screw and between the shoulder and the second element. In operation, the screw may be rotated for compressing the spring between the shoulder and the second element. The compressed spring urges the first and second pulleys away from one another for applying tension force to the belt. The device includes a visual indicator in contact with the adjusting screw which indicates when the screw has been compressed by a proper amount.

19 Claims, 4 Drawing Sheets

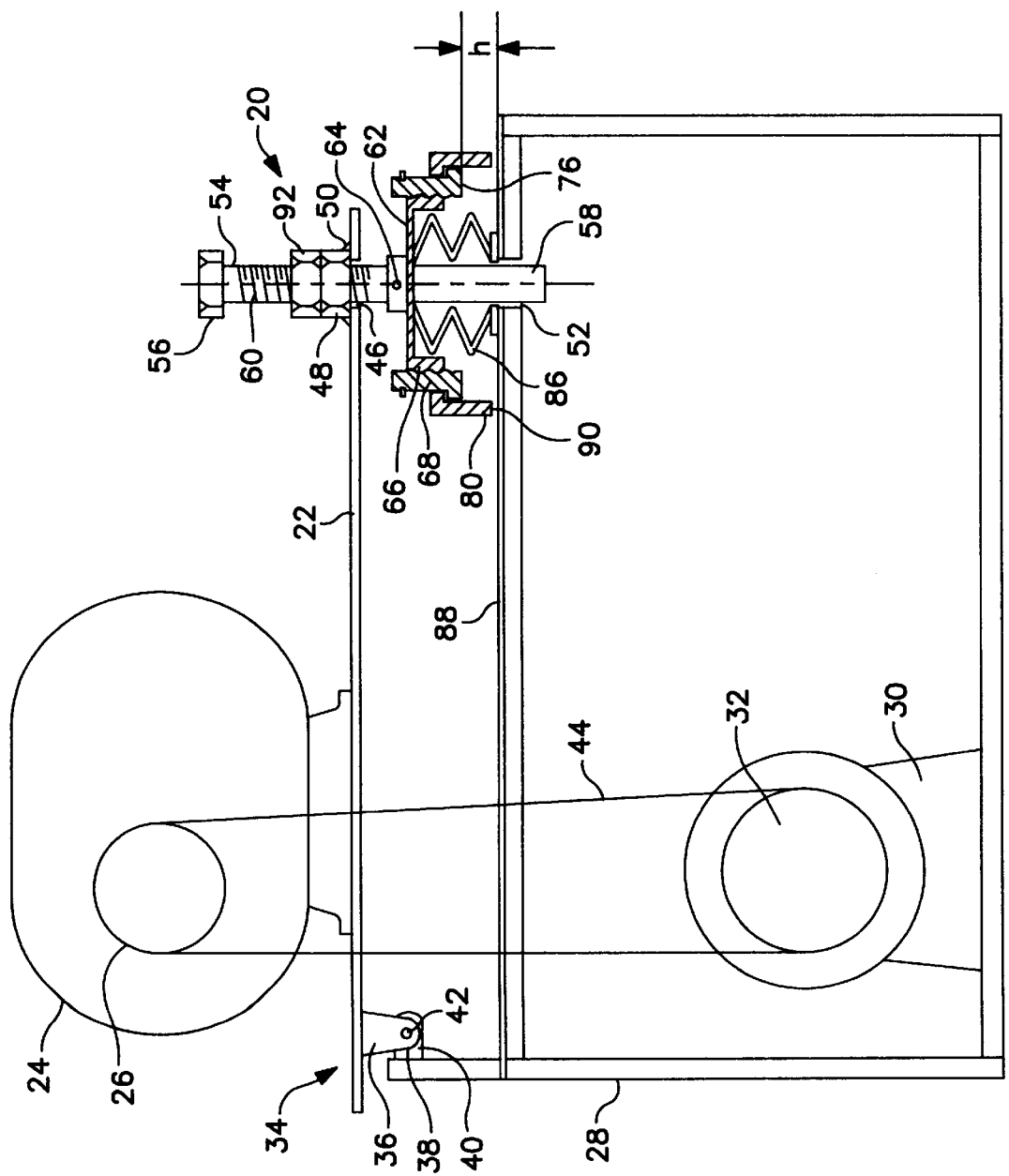
FIG. I

SEMI-AUTOMATIC TENSIONER FOR A BELT DRIVE SYSTEM

FIELD OF THE INVENTION

The present invention relates to a tensioning device for a continuous belt and more specifically relates to a semi-automatic tensioning device for a belt drive system which includes visual indicia for indicating that a proper amount of tension force has been placed upon a drive belt.

BACKGROUND OF THE INVENTION

Providing correct belt tension is absolutely essential for proper operation of belt driven equipment. If there is too little tension, the belt can slip, thereby resulting in an inefficient and inaccurate drive train and a significant level of noise. On the other hand, if the belt tension is too great, excess heat and friction may develop, thereby resulting in a short belt life, reduced bearing life and even shaft breakage.

There are many existing designs for tensioning the continuous belts of belt driven systems. Generally, these may be classified into one of two groups: automatic tension designs or manual tension designs. Automatic tension designs include those that use the weight of the motor or a spring force to tension the belt. The automatic tension designs are often complex, bulky and are limited in their ability to correctly tension the belt. Manual designs include slide bases and jack screw designs. When using manual tension methods, service personnel may inadvertently over-tension the belt which may result in the short belt life and/or reduced bearing life problems discussed above. Moreover, when adjusting the belt tension using the manual tension method, it is often necessary to obtain the assistance of another individual. During this relatively complex operation, one of the pulleys in the belt assembly must be loosened, moved, held in position and then reDocket secured while simultaneously maintaining the desired belt tension. Moreover, after the pulley has been re-secured, the tension in the belt is often at an improper level.

Thus, there is a need for a tensioning device which easily and accurately applies the correct amount of tension force to a continuous belt, increases the life of the belt and minimizes the potential for damaging the system components during a belt tensioning operation.

SUMMARY OF THE INVENTION

In accordance with one preferred embodiment of the present invention, a belt tensioning device includes a first element having a threaded opening and a first pulley or sheave supported on the first element. The belt tensioning device includes a second element having an opening in substantial alignment with the threaded opening of the first element and a second pulley or sheave supported on the second element. The tensioning device also includes a rotatable adjusting screw which extends between the first and second elements, the adjusting screw having a first end including a threaded portion which is adapted to threadably engage the threaded opening of the first element and a second end remote therefrom which is adapted to extend into the opening of the second element. The belt tensioning device also preferably includes a continuous belt secured around and between the first and second pulleys. In certain embodiments the first element is pivotally secured to the second element at a first location. In other embodiments, the first or second element may be on a slidable base. The first element may include an airend for an air compressor and the second element may include a motor for driving the airend. In certain preferred embodiments, the airend includes at least one rotor and the first pulley is secured to the at least one rotor. The motor is designed for driving the second pulley. In one particular embodiment the motor drives the second pulley which, in turn, drives the continuous belt. In turn, the continuous belt drives the first pulley and the at least one rotor connected thereto.

The belt tensioning device also includes an element for applying a tension force to the continuous belt. In one preferred embodiment, the tension force applying element includes a shoulder, such as an annular shoulder having an outer periphery, fixed between the first and second ends of the screw. The tension force applying element may also include a spring provided around the screw, between the fixed shoulder and the second element. The spring preferably includes at least one Belleville spring and more preferably includes a plurality of Belleville springs which are secured around the screw and stacked one atop the other. The adjusting screw may be rotated, preferably in the clockwise direction, for compressing the spring between the fixed shoulder and the second element. After the spring has been compressed, the spring urges the first and second pulleys away from one another, thereby applying a tension force to the continuous belt secured around and between the pulleys.

The belt tensioning device may also include an indicator element in contact with the adjusting screw for indicating the level or amount of compression of the spring. The indicator element preferably includes a threaded collar capable of being threadably secured to the fixed shoulder. The threaded collar includes an upper end, a lower end and internal threads between the upper and lower ends. The internal threads of the threaded collar are preferably threadably engaged with the outer periphery of the shoulder. The threaded collar also preferably includes a flange extending outwardly from the lower end thereof. The indicator element may also include a working height collar surrounding the threaded collar, the working height collar being adapted for sliding freely over the exterior surface of the threaded collar. The working height collar preferably has a lower end, an upper end and a flange extending inwardly from the upper end. The threaded collar may include a retaining ring which is fixed about the exterior surface of the threaded collar, adjacent the upper end thereof, for preventing the working height collar from moving above the upper end of the threaded collar.

The indicator element is preferably movable between a first position in which the flange at the lower end of the threaded collar is in contact with the flange at the upper end of the working height collar and a second position in which the flange of the threaded collar engages or contacts the second element. When the indicator element is in the first position, the spring is generally in an extended, uncompressed position. When the indicator element is in the second position, the spring is generally in the compressed position.

The threaded opening in the first element may include a fixed nut which is permanently secured to the first element. The fixed nut preferably includes internal threads adapted for receiving the threads of the adjusting screw. In certain embodiments, the nut is integrally formed with the first element. In other embodiments, the nut may be welded to the first element. In certain preferred embodiments, the belt tensioning device includes a securing element for selectively preventing unwanted rotation of the adjusting screw relative to the fixed nut. The securing element holds the screw in place and prevents the screw from rotating after the desired tension level has been set on the spring. The securing element may include a locking nut which is threadably engaged with the screw. When the spring has been compressed to the desired tension level, the locking nut may be rotated toward the fixed nut until a surface of the locking nut engages a surface of the fixed nut. Engagement of the locking nut and the fixed nut will prevent rotation of the adjusting screw.

It is well know to those skilled in the art that springs suffer from creep after being used for a period of time. As a result of creep, a worn spring, in the uncompressed position, will be relatively shorter than the same spring when the spring was new. For example, a new spring in an initial uncompressed position may be approximately four inches high and will generate a certain force upon being compressed to a height of three inches. However, over time the spring will shrink so that its uncompressed height is significantly less than four inches. For example, the worn spring may have an uncompressed height of about three and one-half inches so that compressing the spring to a height of three inches will result in the spring being compressed one-half inch. Obviously, compressing the worn spring one-half inch to a height of three inches will not produce the same compression force as was generated when the spring, when new, was compressed one inch to a final height of three inches. In fact, the worn spring would generally have to be compressed to a final height of about two and one-half inches to achieve the same force achieved when the new spring was compressed to a height of three inches. Thus, prior art devices and methods which measure the final compressed height of the spring may work effectively when the spring is new, but these devices will not work accurately for worn springs. As such, the present invention, which measures the amount of compression of the spring, is much more accurate for determining the true force exerted by the compressed spring.

In preferred embodiments, the first and second elements may be pivotally connected to one another at at least a first location. In these particular embodiments, the tension force applying element is remote from the first location. In one particular preferred embodiment, a peripheral region of the first element is pivotally secured to a peripheral region of the second element and the adjusting screw is positioned remote from the peripheral regions of the first and second elements. As mentioned above, in further preferred embodiments the second element may be stationary and the first element may be mounted on a slidable base which moves toward and away from the second element. In yet further embodiments, the first element remains stationary and the second element is mounted on a slidable base.

These and other objects, advantages, and features of the present invention will become more readily apparent in view of the following detailed description, drawings and claims.

BRIEF DESCRIPTION OF THE DRAWINGS.

FIG. 1 shows a cross-sectional view of a belt tensioning device for a belt drive system including a compression spring and an adjusting screw in accordance with preferred embodiments of the present invention.

DETAILED DESCRIPTION OF PREFERRED EMBODIMENTS

Figure 2A:
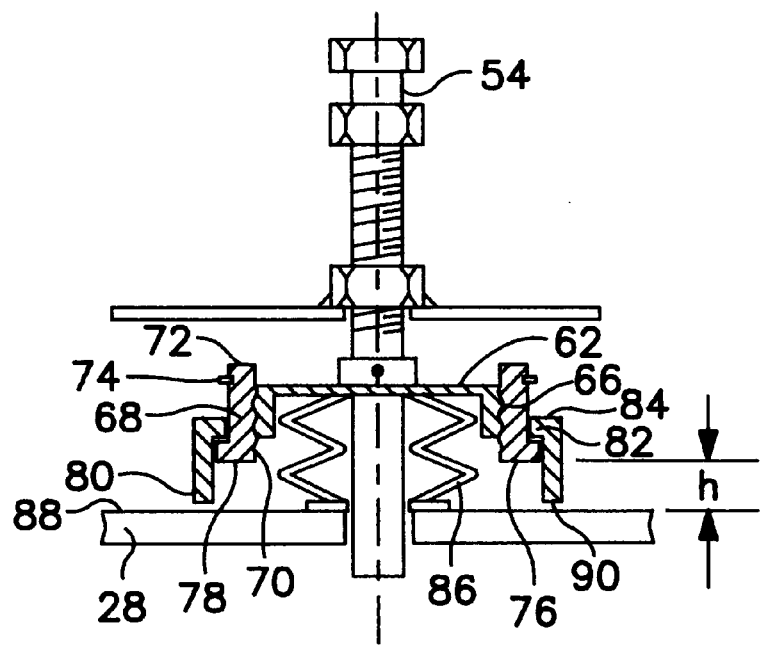
FIG. 2A shows a fragmentary cross-sectional view of the belt tensioning device of FIG. 1 in a first position in which the compression spring applies substantially no tension force to a continuous belt.

FIG. 1 illustrates a semi-automatic belt tensioning device 20 for a belt drive system in accordance with certain preferred embodiments of the present invention. The belt drive system may include a first element 22, such as a support for an airend 24 of an air compressor. The airend 24 may include at least one rotor (not shown) and a first pulley 26 or sheave connected to the at least one rotor so that rotation of the first pulley 26 drives the at least one rotor. The belt drive system also preferably includes a second element 28, such as a package frame, for supporting a motor 30 having a second pulley 32 or sheave mounted thereon. The motor 30 may be selectively operated for causing rotation of the second pulley 32. The airend support 22 is preferably pivotally connected to the package frame 28. In the particular embodiment shown in FIG. 1, a peripheral portion 34 of the airend support 22 includes a downwardly extending U-shaped flange 36 having an opening 38 extending through each prong of the flange 36 and the package frame 28 includes a flange 40 having an opening extending therethrough. After the flange openings of the airend support 22 and the package frame 28 have been aligned with one another, the airend support 22 and the package frame 28 may be pivotally secured together, such as by providing a single pin 42 through the aligned openings and securing the pin in place. The belt drive system includes a continuous belt 44 provided around and between the first pulley 26 and the second pulley 32 so that during operation of the motor 30, the motor 30 rotates the second pulley 32 which, in turn, rotates the continuous belt 44. Movement of the belt 44 drives the first pulley 26 which, in turn, drives the at least one rotor (not shown) of the airend 24 for compressing fluid within an air compressor system.

In one preferred embodiment of the present invention, the tension device includes an opening 46 extending through a portion of the airend support 22 and an internally threaded nut 48 fixed over the opening 46. The opening of the fixed nut 48 is preferably aligned over the opening 46 of the airend support 22. The fixed nut 48 may be welded to the airend support 22 using a fusible material 50, such as solder. The semi-automatic tensioner 20 also includes an opening 52 formed in the package frame 28. The package frame opening 52 is in substantial alignment with the opening 46 extending through the airend support 22 and the internally threaded opening (not shown) extending through the fixed nut 48.

The semi-automatic tensioner also preferably includes an adjusting screw 54 having a head 56, a tip end 58 remote therefrom and external threads 60 between the head 56 and the tip end 58 so that the adjusting screw 54 may be threadably engaged with the internal threads (not shown) of the fixed nut 48. The adjusting screw 54 includes a shoulder 62 fixed between the external threads 60 and the tip end 58 thereof. The shoulder 62 may be fixed to the adjusting screw 54 with a pin 64 so that the shoulder rotates simultaneously with the adjusting screw. The periphery of the shoulder 62 may include a wide range of geometric shapes and preferably has a ring or annular-shaped outer periphery. In certain preferred embodiments the outer periphery of the shoulder 62 may include external threads 66.

Referring to FIGS. 1 and 2A, the semi-automatic belt tensioner also preferably includes a threaded collar 68 threadably engaged with the fixed shoulder 62. The threaded collar 68 is preferably substantially annular and includes internal threads 70 which are adapted for meshing with the external threads 66 of the fixed shoulder 62. The threaded collar 68 has an upper end 72 including a retaining ring 74 secured adjacent the upper end 72 and an externally projecting flange 76 which projects from a lower portion 78 thereof. A working height collar 80, preferably having an annular shaped outer periphery, is provided over the outer periphery of the threaded collar 68. The working height collar 80 has an internally extending flange 82 at an upper end 84 thereof. The externally projecting flange 76 of the threaded collar 68 and the internally projecting flange 82 of the working height collar 80 are coupled with one another so that movement of the working height collar 80 with respect to the threaded collar 68 is limited to an area extending between the retaining ring 74 and the externally projecting flange 76 of the threaded collar 68. The semi-automatic tensioner 20 includes at least one spring 86, such as a Belleville spring, provided around the adjusting screw 54, between the fixed shoulder 62 and a top surface 88 of the package frame 28. In more preferred embodiments, the spring 86 preferably includes a plurality of Belleville springs which are stacked in series one atop the other. The threaded collar 68 and the working height collar 80 cooperatively provide a structure which indicates the amount of compression placed upon the spring.

Figure 2B:
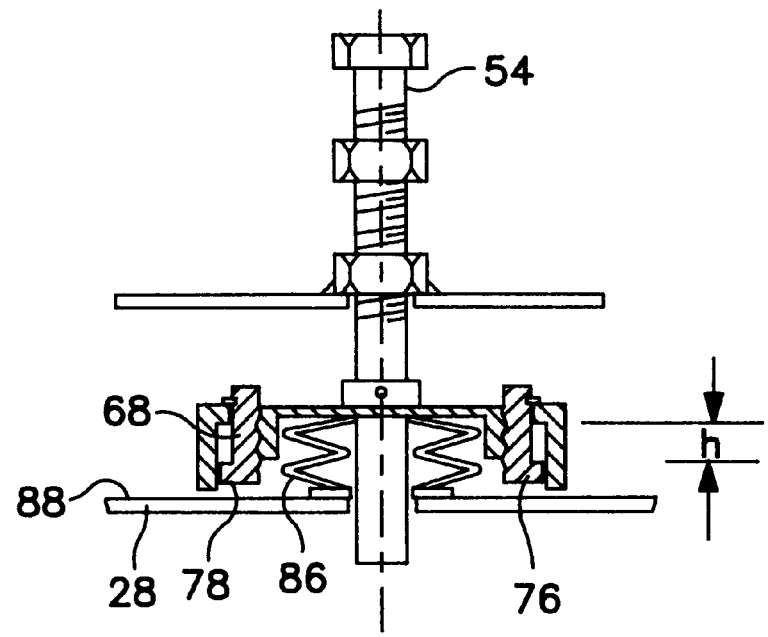
FIG. 2B shows a fragmentary cross-sectional view of the belt tensioning device of FIG. 2A after the compression spring has been compressed a predetermined distance.
Figure 2C:
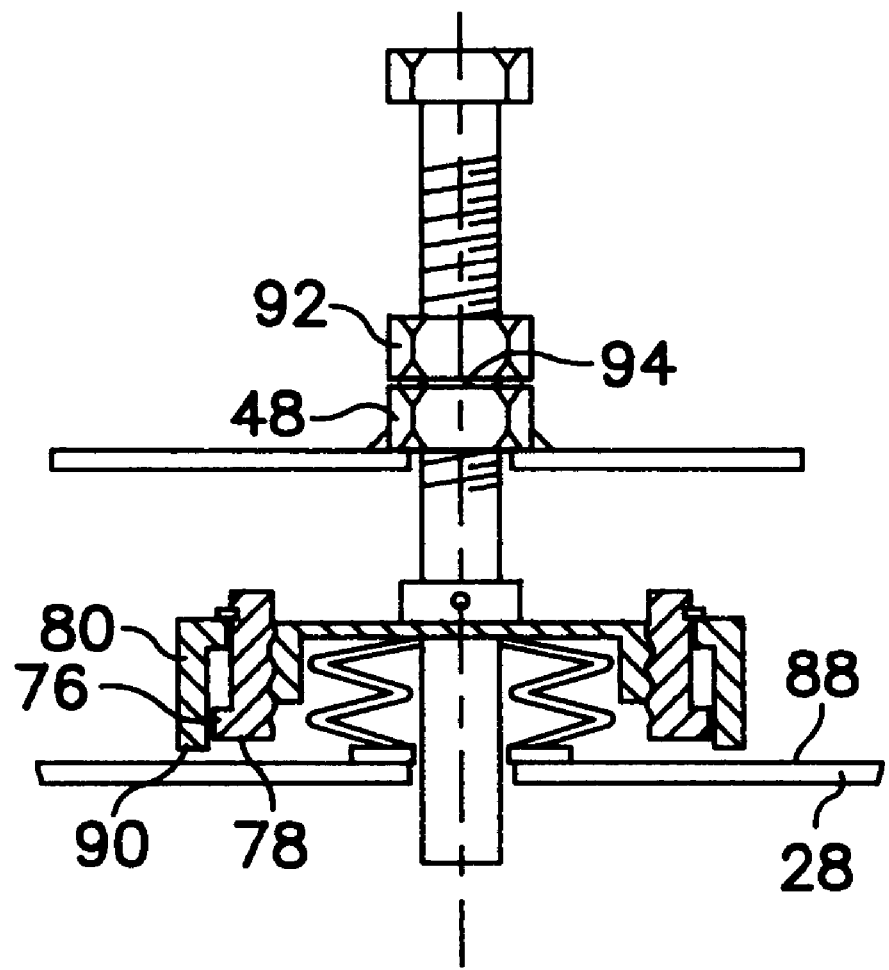
FIG. 2C shows a fragmentary cross-sectional view of the belt tensioning device of FIG. 2B with a locking nut positioned for preventing the adjusting screw from rotating.

In order to properly adjust the continuous belt 44 of the belt drive system to a proper tension level, the adjusting screw 54 is rotated, preferably in a counter-clockwise direction, until no belt load is being carried by the spring 86. Once the belt tension device has been placed in a no load position (i.e., no belt load on the spring), the device must be adjusted so that the spring may be compressed by the predetermined amount. Compressing the spring a predetermined amount, as opposed to compressing the spring to a certain height above the package element 28, provides a more accurate indication of the force generated by the spring. The belt tensioning device is adjusted by rotating the threaded collar 68 upwardly until the lower end 90 of the working height collar just touches the upper surface 88 of the package frame 28. Referring to FIG. 2A, as the threaded collar 68 is rotated upwardly, the outwardly extending flange 76 of the threaded collar 68 engages the inwardly extending flange 82 of the working height collar 80. Further rotation of the adjusting screw 54 moves the threaded collar 68 and the working height collar 80 away from the package element 28 until the bottom 90 of the working height collar is just above or slightly engages the top surface 88 of the package frame 28. The working height collar 80 is considered to be properly positioned when the lower end 90 of the working height collar 80 is just above or slightly contacts the upper surface 88 of the package frame 28. Referring to FIG. 2B, the adjusting screw 54 is now rotated in a clockwise direction for moving the airend support 22 away from the package frame 28. As the airend support 22 moves away from the package frame 28, the first and second pulleys 26 and 32 move away from one another until the continuous belt 44 is placed under tension. Once the belt 44 is under initial tension, the belt 44 will resist further movement of the airend support 22 with respect to the package frame 28 as the adjusting screw 54 is rotated. Further rotation of the screw 54 will result in the belt 44 being stretched and the spring 86 being compressed. The compression force generated by the spring 86 is generally equal and opposite to the tension in the belt 44. The bottom end 87 of the spring 86, i.e., the end abutting against the package frame 28, remains stationary and the top end 89 of the spring 86 is compelled to move in a downward direction toward the bottom end 87 thereof. Because the spring 86 is compressed against the resistance of the belt 44, further rotation of the screw 54 will result in the screw moving in a substantially downward direction with respect to the airend support 22. As the screw 54 moves downward, the shoulder 62 compresses the top end 87 of the spring 86 toward the package frame 28. The adjusting screw 54 is further rotated until the bottom surface 78 of the threaded collar 76 engages the top surface 88 of the package frame 28. Once the bottom surface 78 of the threaded collar 68 has bottomed out on the upper surface 88 of the package frame 28, the spring 86 has been compressed by the predetermined amount or distance designated "h". The distance "h" is generally predetermined so that when the spring 86 has been compressed this predetermined amount, a desired tension force will be exerted by the spring 86 upon the continuous belt 44 (FIG. 1). As discussed above, compressing the spring by a predetermined amount is highly preferred over prior art methods which compress the spring to a certain height. After the proper belt tension has been set, further movement of the spring 86 or the adjusting screw 54 is undesirable. Referring to FIG. 2C, in order to prevent such undesirable movement, a lock nut 92 is rotated downwardly toward the fixed nut 48 welded to the airend support 22. The lock nut 92 is rotated downwardly until it engages the top surface 94 of the fixed nut 48, thereby preventing unwanted rotation and/or movement of the adjusting screw 54.

Referring to FIG. 1, if the continuous belt 44 stretches during continued use of the belt drive system, the outwardly projecting flange 76 of the threaded collar 68 will move away from the top surface 88 of the package frame 28. When a gap develops between the bottom surface of the flange 76 and the package frame 28, this will indicate that the belt tension has been reduced. This reduced belt tension may result from normal stretching of the belt. In any event, the system must be adjusted so that proper tension force is applied to the belt. This may be accomplished by further rotating the adjusting screw so as to further compress the spring. The screw is rotated until the bottom surface of the flange once again contacts the top surface of the package frame. Thus, the present invention provides a semi-automatic belt tensioner 20 which may be visually checked at any time to insure that the belt is properly tensioned. As mentioned above, this is achieved by insuring that the gap between the bottom surface 78 of the flange 76 of the threaded collar 68 and the top surface 88 of the package frame 28 is essentially non-existent or within specified minimum limits. In the event of belt breakage or other failure (i.e., a no load condition), it is possible to check that proper tensioning procedures were followed. This may be accomplished by checking that the lower end 90 of the working height collar 80 engages or is adjacent the top surface 88 of the package frame 28.

Figure 3:
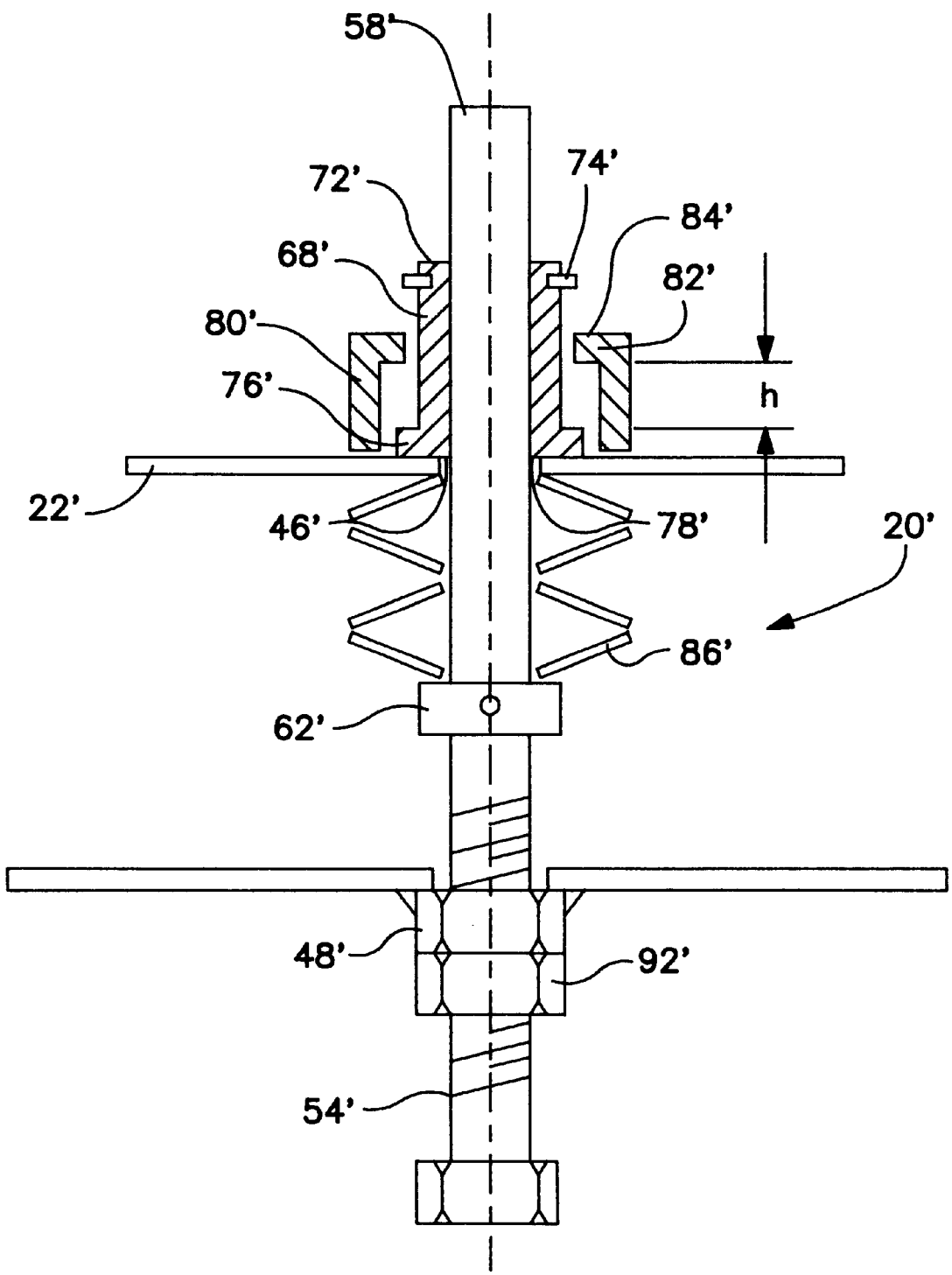
FIG. 3 shows a cross-sectional view of a belt tensioning device in accordance with further preferred embodiments of the present invention.

FIG. 3 shows another preferred embodiment of the present invention. In this embodiment, the semi-automatic tensioner includes aligned openings 46' and 52' extending through the airend support 22' and the package frame 28', respectively. The package frame 28' includes an internally threaded nut 48' which is fixed thereto. The adjusting screw 54' is threaded through the fixed nut 48' and the tip end 58' of the screw 54' is extendable through the opening 46' in the airend support 22. The adjusting screw 54' includes a shoulder 62' fixed thereto. A spring 86' which may be compressed is provided around the adjusting screw 54', between the shoulder 62' and the airend support 22'. The tensioner 20' includes a collar 68' threadably secured adjacent the tip end 58' of the screw 54'. The collar 68' has a retaining ring 74' at an upper end 72' thereof and an outwardly projecting flange 76' at a lower end 78' thereof. The tensioner 20' includes a working height collar 80' supported over the airend support 22'. The working height collar 80' has an internally projecting flange 82' at an upper end 84' thereof. The respective flanges 76' and 82' of the threaded collar 68' and the working height collar 80' provide a visual indication of the level of compression of the spring 86'. The tensioner includes a locking nut 92' threadably engaged with the adjusting screw 54' for selectively preventing rotation of the screw. The semi-automatic tensioner shown in FIG. 3 operates in a substantially similar manner to the embodiment shown in FIGS. 1 and 2AC. In one embodiment the proper amount of tension is placed upon the continuous belt by rotating the screw 54' until the flange 76' of the threaded collar 68' engages the flange 82' of the working height collar 80'.

Although preferred embodiments of the present invention have been described and illustrated herein, it will be apparent to those skilled in the art that various modifications may be made without departing from the spirit or scope of the invention. For example the present invention may be easily adapted for package designs other than those utilizing a pivoting airend or motor. Preferred embodiments may also be adapted for belt drive systems using slide bases or idler pulleys for tensioning. In addition, preferred tensioners may not include a threaded nut fixed to the first support element, but may have internal threads formed through the opening of the first support. It is also contemplated that a wide variety of springs, other than Belleville springs, may be used for providing tension force to a continuous belt.

What is claimed is:

1. A belt tensioning device comprising:
   a first element having a threaded opening;
   a first pulley supported on said first element;
   a second element having an opening in substantial alignment with the threaded opening of said first element;
   a second pulley supported on said second element;
   a continuous belt secured around and between said first and second pulleys;
   a rotatable screw extending between said first and second support elements, said screw having a first end including a threaded portion adapted for threadably engaging the first support element and a second end remote therefrom extending toward said second support element; and
   means for applying a tension force to said belt, said means located between said substantially aligned openings in said first and second elements.

2. The belt tensioning device as claimed in claim 1, wherein said means for applying a tension force to said belt includes a shoulder fixed between the first and second ends of said screw, said shoulder having an outer periphery, and a spring provided around said screw and between said shoulder and said second element, wherein said screw may be rotated for compressing said spring between said shoulder and said second support element, said compressed spring urging said first and second pulleys away from one another for applying the tension force to said belt.

3. The belt tensioning device as claimed in claim 2, further comprising an indicator element in contact with said screw for indicating the amount of compression of said spring.

4. The belt tensioning device as claimed in claim 3, wherein said indicator element comprises:
   a threaded collar surrounding said shoulder, said threaded collar having an upper end, a lower end and internal threads between the upper and lower ends, the internal threads of said threaded collar being threadably engaged with the outer periphery of said shoulder, said threaded collar including a flange extending outwardly from the lower end thereof; and
   a working height collar surrounding said threaded collar, said working height collar having a lower end, an upper end and a flange extending inwardly from the upper end, wherein said working height collar is adapted for sliding freely over the exterior surface of said threaded collar.

5. The belt tensioning device as claimed in claim 4, wherein said threaded collar includes a retaining ring fixed around the exterior surface of said threaded collar, adjacent the upper end thereof, for preventing the working height collar from moving above the upper end of said threaded collar.

6. The belt tensioning device as claimed in claim 4, wherein said indicator element is movable between a first position in which the flange of said threaded collar is in contact with the flange of said working height collar and a second position in which the flange of said threaded collar contacts said second support element.

7. The belt tensioning device as claimed in claim 1, wherein said first support element is pivotally secured to said second element at a first location and said means for applying a tension force to said belt is remote from the first location.

8. The belt tensioning device as claimed in claim 1, wherein a first peripheral region of said first element is pivotally secured to said second element and said rotatable screw is remote from the first peripheral region.

9. The belt tensioning device as claimed in claim 1, further comprising a securing element for selectively preventing rotation of said screw.

10. The belt tensioning device as claimed in claim 9, wherein said securing element includes a locking nut threadably engaged with said screw.

11. The belt tensioning device as claimed in claim 1, wherein the threaded opening in said first element includes a nut permanently secured to said first element, said nut having internal threads adapted for receiving the threads of said screw.

12. The belt tensioning device as claimed in claim 11, wherein the nut permanently secured to said first element is integrally secured thereto.

13. The belt tensioning device as claimed in claim 11, wherein the nut is welded to said first element.

14. The belt tensioning device as claimed in claim 1, wherein said first element includes an airend for an air compressor and said second element includes a motor for driving said airend.

15. The belt tensioning device as claimed in claim 14, wherein said airend has at least one rotor and said first pulley is secured to said at least one rotor.

16. The belt tensioning device as claimed in claim 15, wherein said motor is adapted for driving said second pulley.

17. The belt tensioning device as claimed in claim 16, wherein rotation of said second pulley drives said belt which, in turn, drives said first pulley and said at least one rotor connected thereto.

18. The belt tensioning device as claimed in claim 1, wherein said spring includes at least one Belleville spring.

19. The belt tensioning device as claimed in claim 18, wherein said at least one Belleville spring includes a plurality of Belleville springs stacked one atop the other.

\* \* \* \* \*